United States Patent Office 2,842,569
Patented July 8, 1958

2,842,569

HYDROLYSIS OF HYDROCORTISONE ACETATE AND Δ¹-HYDROCORTISONE ACETATE

Arthur R. Hanze, Kalamazoo Township, Kalamazoo County, Mich., assignor to The Upjohn Company, Kalamazoo, Mich., a corporation of Michigan No Drawing. Application June 10, 1955
Serial No. 514,760

3 Claims. (Cl. 260—397.45)

This invention relates to a process for the production of hydrocortisone and Δ¹-hydrocortisone, more particularly to an advantageous method for the hydrolysis of hydrocortisone acetate and Δ¹-hydrocortisone acetate. This application is a continuation-in-part of my application Ser. No. 374,103, filed August 13, 1953, and now abandoned.

It is an object of the present invention to provide a process for the hydrolysis of hydrocortisone acetate and Δ¹-hydrocortisone acetate to produce hydrocortisone and Δ¹-hydrocortisone, respectively, in high yield. Other objects will be apparent to those skilled in the art to which this invention pertains.

According to the present invention, hydrocortisone acetate or Δ¹-hydrocortisone acetate dissolved in a substantially oxygen-free lower-alkanol is mixed with at least a molar equivalent of an alkali-metal bicarbonate and the reaction is continued, in the absence of atmospheric oxygen and significant amounts of carbon dioxide, at a temperature between about ten and about thirty degrees centigrade to produce hydrocortisone which is then isolated from the reaction mixture after neutralizing the mixing with a dilute aqueous acid, preferably at a temperature below about thirty degrees centigrade.

The process of the present invention may be illustratively represented by the following formulae:

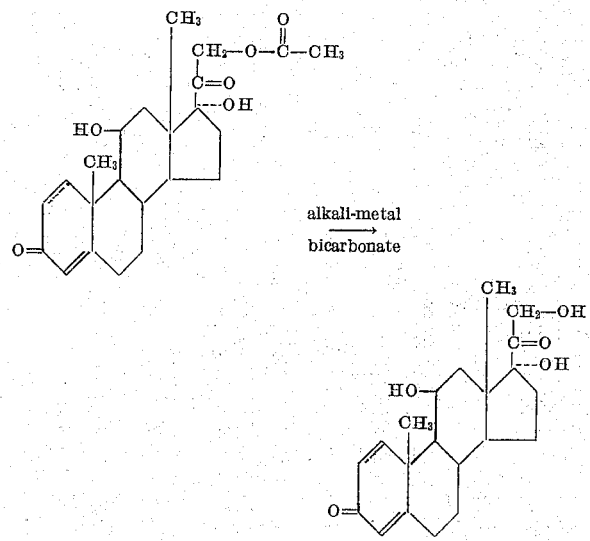

wherein the dotted line represents a double bond at the 1(2) position which is present when the starting steroid is Δ¹-hydrocortisone acetate (11β,17α-dihydroxy-21-acetoxy-1,4-pregnadiene-3,20-dione).

When following the method of the present invention, substantially pure hydrocortisone, usually in its low melting form, and Δ¹-hydrocortisone can be obtained and isolated in very high yield from the hydrolysis of hydrocortisone acetate and Δ¹-hydrocortisone acetate, respectively, without the necessity of further purification. As is well known in chemistry substantially quantitative yields of pure product, directly from a reaction, are seldom obtained. This is particularly true in reactions involving steroids having the labile 11β-hydroxy group and/or the dihydroxy acetone side chain. However, when following the specific hydrolysis procedure of the present invention, about a 95 percent yield of pure hydrocortisone or Δ¹-hydrocortisone can be obtained from its acetate without any further purification.

The prior art has hydrolyzed hydrocortisone acetate and other acetate esters of 21-hydroxy steroids. The use of both weak and strong alkali has been suggested by Reichstein, U. S. 2,401,775. He did not, however, employ a means for maintaining the reaction mixture free from atmospheric oxygen and consequently, a low yield of free alcohol was obtained. The hydrolysis of steroids possessing the Δ⁴-3-keto-11β-hydroxy nucleus to produce a steroid possessing a dihydroxy acetone side chain presents unique problems. Minlon and Tishler, U. S. 2,634,277, mention that unsatisfactory results are obtained using acid or weakly alkaline hydrolyzing agents which give poor yields of free alcohol in the hydrolysis of Δ⁴-3,11,20-triketo-17α-hydroxy-21-acyloxy-pregnane, i. e., esters of cortisone, and required about two days for the hydrolysis operation.

It has now been found that under the operating conditions described below, about a 95 percent yield of hydrocortisone or Δ¹-hydrocortisone can be obtained from its acetate in about four hours, a result in direct opposition to that described by Minlon and Tishler when using a related process on a related steroid. The use of an alkali-metal bicarbonate as the hydrolyzing agent, under the reaction conditions of the present invention, permits the use of less exact reaction conditions from those employed by Minlon and Tishler who employ precisely measured equivalents of reactants and carefully controlled reaction times, which conditions are difficult to duplicate on an industrial scale, while still permitting a practically quantitative recovery of pure hydrolyzed steroid.

The hydrolysis agents utilized herein are the alkali-metal bicarbonates, i. e., sodium bicarbonate, potassium bicarbonate and lithium bicarbonate, with potassium bicarbonate or sodium bicarbonate being preferred and potassium bicarbonate being particularly desirable because of its greater solubility in the reaction mixture. A mole of alkali-metal bicarbonate per mole of starting steroid is theoretically required but a substantial molar equivalent excess is usually used since optimum yields of the steroidal free alcohol are thus obtained.

The starting hydrocortisone acetate or Δ¹-hydrocortisone acetate is dissolved in a lower-alkanol, e. g., methanol, ethanol, isopropanol, tertiary butyl alcohol, preferably methanol, and mixed with the alkali-metal bicarbonate dissolved in water. Since free oxygen in the reaction mixture is disadvantageous, the reaction is carried out in the substantial absence of oxygen. This is preferably achieved by bubbling nitrogen through the methanol and the aqueous solutions prior to their mixing and then maintaining the mixture in a nitrogen atmosphere by flushing oxygen-free nitrogen over the surface and/or by bubbling it through the mixture during the reaction. Antioxidants may advantageously be employed to inhibit oxidation reactions.

The reaction is carried out at between about ten and about thirty degrees centigrade. Since the reaction is exothermic, the reaction temperature can conveniently be maintained within these limits by cooling the methanol and aqueous solutions to about ten to twenty degrees centigrade prior to their mixing. During the reaction, the temperature will then rise to about room temperature if no external heating or cooling is applied. Although the reaction is substantially complete in a relatively short time, the reaction mixture is preferably maintained for several hours to ensure a complete reaction.

The thus-produced hydrocortisone or $\Delta^1$-hydrocortisone is then isolated by neutralizing the reaction mixture with an acid, preferably a weak acid such as, for example, acetic acid, and preferably in the cold. For complete precipitation of the hydrocortisone, the neutralized solution is concentrated by distillation of the organic solvent therefrom at reduced pressure, preferably at or below room temperature. A further procedure to ensure complete precipitation of the hydrocortisone or $\Delta^1$-hydrocortisone involves chilling the thus-concentrated solution. Filtering the concentrated and chilled solution separates substantially all of the steroidal material from the mixture. Washing the filter cake with cold water followed by drying is productive of from about ninety percent to an almost quantative yield of substantially pure hydrocortisone or $\Delta^1$-hydrocortisone.

The following examples are illustrative of the process and products of the present invention which is not to be construed as limited thereto.

PREPARATION 1

*2,21 - diethoxyoxalyl - 11 - ketoprogesterone and sodium dienolate thereof*

Nineteen milliliters (0.136 mole) of ethyl oxalate and 21.2 milliliters (0.047 mole) of a 2.2 Normal methanolic solution of sodium methoxide was added to a solution of 6.9 grams (0.021 mole) of 11-ketoprogesterone in 100 milliliters of anhydrous tertiary butyl alcohol at about fifty degrees centigrade. The mixture was maintained at room temperature for three hours, whereafter the precipitated sodium dienolate of 2,21-diethoxyoxalyl-11-ketoprogesterone was filtered, washed with ether and then dissolved in water. The aqueous solution was acidified with dilute hydrochloric acid and the thus-precipitated 2,21-diethoxyoxalyl-11-ketoprogesterone was filtered therefrom and then dried to yield 10.2 grams, a yield of 92 percent of the theoretical, of 2,21-diethoxyoxalyl-11-ketoprogesterone in the form of a yellow amorphous powder which exhibited a reddish color in an alcoholic ferric chloride solution.

PREPARATION 2

*Methyl - 2 - bromo - 3,11 - diketo - 4,17(20) - pregnadiene-21-oate*

A solution of eight grams (0.015 mole) of the 2,21-diethoxyoxalyl-11-ketoprogesterone obtained according to the method described in Preparation 1 and 5.9 grams (0.60 mole) of anhydrous potassium acetate in 140 milliliters of methanol was cooled to zero degrees centigrade in an ice bath and a solution of 7.4 grams (0.046 mole) of bromine in 74 milliliters of methanol was then added dropwise thereto over a period of about one-half hour to produce 2,21,21-tribromo-2,21-diethoxyoxalyl-11-ketoprogesterone. To the resulting mixture was then added about fifty milligrams of phenol and 67 milliliters (0.100 mole) of a 1.5 Normal methanolic solution of sodium methoxide whereafter the mixture was heated for five minutes on a steam bath followed by the addition of the cooled solution to water. A flocculent white precipitate of methyl 2-bromo-3,11-diketo-4,17(20)-pregnadiene-21-oate formed, and, after being thoroughly washed with water and dried in a vacuum desiccator, weighed 6.77 grams and melted at 74 to 94 degrees centigrade. 1.50 grams of this impure product was chromatographed over 150 grams of Florisil magnesium silicate. The column was developed with 200-milliliter portions of solvents of the following composition and order: one of benzene, ten of Skellysolve B hexane hydrocarbons plus five percent acetone, and ten of Skellysolve B plus 7.5 percent acetone. The second, third and fourth portions of Skellysolve B plus 7.5 percent acetone eluates were combined and the product was distilled therefrom leaving 382 milligrams of product melting at 130 to 154 degrees centigrade. Recrystallization of these crystals from methanol gave analytically pure methyl 2-bromo-3,11-diketo-4,17(20)-pregnadiene-21-oate as transparent prisms whose melting point varied between 155 to 160 degrees centigrade and 160 to 162 degrees centigrade, depending upon the rate of heating.

PREPARATION 3

*Methyl 3-keto-1,4,17(20)-pregnatriene-21-oate*

A mixture of 0.21 gram of methyl 2-bromo-3-keto-4,17(20)-pregnadiene-21-oate and 0.8 milliliter of redistilled γ-collidine was heated at the refluxing temperature of the mixture for thirty minutes and then cooled to room temperature. The cooled mixture was diluted with ether and the 29 milligrams of collidine hydrobromide which precipitated was filtered from the solution. The filtrate was washed with dilute sulfuric acid followed by water and then dried over anhydrous sodium sulfate. The dried solution was freed of solvent and the residue was crystallized from ethyl acetate to give methyl 3-keto-1,4,17(20)-pregnatriene-21-oate melting at 209.2 to 218.7 degrees centigrade and, after recrystallization from ethyl acetate, melting at 229.2 to 233 degrees centigrade.

PREPARATION 4

*11β,21-dihydroxy-1,4,17(20)-pregnatriene-3-one*

A solution of 1.0 gram of 3,11-diketo-1,4,17(20)-pregnatriene-21-oic acid methyl ester, 0.5 milliliter of pyrrolidine, and 1.5 milligrams of para-toluenesulfonic acid in 100 milliliters of benzene were heated at the reflux temperature of the mixture for six hours with the concomitant removal of the water of reaction. The solvent was distilled from the mixture to leave a residue of 3-pyrrolidyl-1,3,5,17(20)-pregnatetraene-21-oic acid methyl ester.

This residue was dissolved in five milliliters of benzene, a suspension of 376 milligrams of lithium aluminum hydride in 290 milliliters of ether was added thereto over a period of five minutes, and the mixture was stirred at room temperature for one hour. Three milliliters of ethyl acetate were added to destroy excess lithium aluminum hydride, followed by five milliliters of water. The ether was distilled at atmospheric pressure from the mixture to leave a residue of 3-pyrrolidyl-11β,21-dihydroxy-1,3,5,17(20)-pregnatetraene and inorganic material.

This crude distillation residue was mixed with 327 milliliters of methanol at 55 degrees centigrade until solution was effected and then cooled to 37 degrees centigrade. 116.5 milliliters of an aqueous five percent sodium hydroxide solution was added thereto and heating of the mixture at about forty degrees centigrade was continued for ten minutes. The solution was neutralized with 3.5 milliliters of acetic acid at below 37 degrees centigrade and the solvent distilled therefrom at reduced pressure and at a temperature below 45 degrees centigrade. The 140 milliliters of residue was mixed with a mixture of 370 milliliters of water and 170 milliliters of concentrated sulfuric acid, stirred for twenty minutes and then filtered and washed with water to give 11β,21-dihydroxy-1,4,17(20)-pregnatriene-3-one which melts at 149 to 153 degrees centigrade when recrystallized from ethylene dichloride, has an $[\alpha]_D$ of plus 117 degrees in chloroform, and an $\epsilon_{243}$ of 14,700. The melting point varies considerably, depending upon the crystallizing solvent.

PREPARATION 5

*11β - hydroxy - 21 - acetoxy - 1,4,17(20)-pregnatriene-3-one*

A solution of 6.6 grams of 11β,21-dihydroxy-1,4,17(20)-pregnatriene-3-one in fifteen milliliters of pyridine, prepared at room temperature, was mixed, at zero degrees centigrade, with fifteen milliliters of acetic anhydride. After one hour at room temperature, copious crystallization had taken place in the resulting mixture. After stirring for a total of eighteen hours, the mixture was filtered and the cake washed with a 50:50 mixture of pyridine and acetic anhydride, followed by water. The cake was dried to give 4.92 grams of 11β-hydroxy-21-acetoxy-1,4,17(20)-pregnatriene-3-one melting at 219 to 223 degrees centigrade. Mixing the original filtrate with water gave 2.12 grams of less pure 11β-hydroxy-21-acetoxy-1,4,17(20)-pregnatriene-3-one melting at 186 to 207 degrees centigrade.

PREPARATION 6

*11β,17α - dihydroxy - 21 - acetoxy - 1,4 - pregnadiene - 3,20 - dione*

To a solution of 1.11 grams (3 millimoles) of 11β-hydroxy-21-acetoxy-1,4,17(20)-pregnatriene-3-one in fifty milliliters of tertiary butyl alcohol was added 1.5 milliliters of pyridine followed by 5.02 milliliters of a tertiary butyl alcohol solution of 7.5 millimoles of N-methylmorpholine oxide peroxide (prepared by the reaction of 7.5 millimoles of N-methylmorpholine with 15.0 millimoles of anhydrous hydrogen peroxide in the tertiary butyl alcohol) followed by 18.4 milligrams of osmium tetroxide in ten milliliters of tertiary butyl alcohol. The solution, which, within five minutes had turned orange-red, was maintained for ninety minutes at 25 degrees centigrade. At the end of this time, the now straw colored solution was mixed with 23 milliliters of 0.5 percent aqueous sodium sulfite at room temperature for 25 minutes and then concentrated, at reduced pressure, to a volume of about forty milliliters. This concentrate was stirred for thirty minutes and 35 milliliters of water was then added portionwise over a period of fifteen minutes. After stirring for 45 minutes, the solution which had gradually precipitated crystals, was filtered, washed with a 1:3 mixture of tertiary butyl alcohol and water, and dried to give 670 milligrams of 11β,17α-dihydroxy-21-acetoxy-1,4-pregnadiene-3,20-dione which melted at 239 to 245 degrees centigrade. Recrystallization of these crystals from hot acetone raised the melting point to 240 to 242 degrees centigrade. The filtrate yielded crystals of 11β,17α - dihydroxy - 21 - acetoxy - 1,4 - pregnadiene-3,20-dione which, after two crystallizations from hot acetone, melted at 243 to 247 degrees centigrade.

EXAMPLE 1

*11β,17α,21 - trihydroxy - 4 - pregnene - 3,20 - dione (hydrocortisone)*

A solution of 4.04 grams (ten millimoles) of hydrocortisone acetate in methanol was freed of oxygen gas by bubbling nitrogen therethrough. A solution of 4.04 grams (40.4 millimoles) of potassium bicarbonate in forty milliliters of water was similarly freed of oxygen. The two solutions were mixed at a temperature of between eighteen and twenty degrees centigrade and in a nitrogen atmosphere. The temperature of the solution rose to between 24 and 26 degrees centigrade and some of the potassium bicarbonate precipitated from the solution. The mixture was stirred at room temperature for five hours while protecting it from atmospheric oxygen with nitrogen. During the first ninety minutes of stirring the solution became homogeneous. At the end of five hours the solution was neutralized by the addition of sixty milliliters of ice water containing three milliliters of glacial acetic acid. The neutralized solution was concentrated to about sixty milliliters by distillation at room temperature at reduced pressure and then chilled in a refrigerator for about sixteen hours. The thus-precipitated hydrocortisone was filtered, washed with ice-water and then dried to yield 3.455 grams, a yield of 95.3 percent of the theoretical, of the low-melting form of hydrocortisone melting at 202 to 205 degrees centigrade, having an $[\alpha]_D$ of plus 167 degrees (in 95 percent ethanol) and an $E_{243}$ of 15,725. Papergram analysis substantiated the purity of the product.

Similar results can be obtained by substituting a molar equivalent of sodium bicarbonate or lithium bicarbonate for the potassium bicarbonate used in the reaction.

EXAMPLE 2

*11β,17α,21 - trihydroxy - 1,4 - pregnadiene - 3,20 - dione*

A solution of seven grams of 11β,17α-dihydroxy-21-acetoxy-1,4-pregnadiene-3,20-dione in 700 milliliters of methanol was freed of oxygen by bubbling nitrogen therethrough. A solution of seven grams potassium bicarbonate in seventy milliliters of water was similarly freed of oxygen and carbon dioxide. The two solutions were mixed and then stirred in an atmosphere of nitrogen, produced by flushing nitrogen over the mixture, for four hours. To the solution was then added 5.25 milliliters of glacial acetic acid in 105 milliliters of water and stirring was continued while concentrating the mixture by distillation of the methanol at reduced pressure until copious precipitation occurred. The 200 milliliters of concentrated mixture was chilled to about zero degrees centigrade, filtered and the filter cake washed well with ice water. The dried filter cake consisted of 5.64 grams, a yield of 89.9 percent of the theoretical, of substantially pure 11β,17α,21-trihydroxy-1,4-pregnadiene-3,20-dione melting at 225 to 230 degrees centigrade with decomposition, having an $[\alpha]_D$ of plus 98 degrees in dioxane and an $E_{244}$ of 14,100. The filtrate was concentrated at reduced pressure to about 150 milliliters. The resulting precipitate was filtered and dried to yield an additional 0.52 gram, a yield of 8.3 percent of the theoretical, of 11β,17α,21-trihydroxy-1,4-pregnadiene-3,20-dione melting at 224 to 239 degrees centigrade.

It is to be understood that the invention is not to be limited to the exact details of operation described, as obvious modifications and equivalents will be apparent to one skilled in the art, and the invention is therefore to be limited only by the scope of the appended claims.

I claim:

1. The process which comprises hydrolyzing a compound selected from the group consisting of hydrocortisone acetate and Δ¹-hydrocortisone acetate with at least a molar equivalent, calculated on the starting steroid, of an alkali-metal bicarbonate in a substantially oxygen-free solution of a mixture of lower-alkanol and water and continuing the reaction at a temperature between about ten and about thirty degrees centigrade while protecting the mixture from atmospheric oxygen; second, neutralizing the saponified mixture with acid; and third, isolating the thus-produced hydrolyzed steroid.

2. A process for the production of substantially pure hydrocortisone which comprises the steps of first, hydrolyzing hydrocortisone acetate by mixing a substantially oxygen-free solution of 11β,17α-dihydroxy-21-acetoxy-4-pregnene-3,20-dione in methanol with an aqueous, substantially oxygen-free solution of potassium bicarbonate in excess of a molar equivalent, calculated on the hydrocortisone acetate, at a temperature between about ten and about thirty degrees centigrade, and continuing the reaction in a substantially oxygen-free, nitrogen atmosphere, at a temperature between about ten and about thirty degrees centigrade; second, neutralizing the hydrolyzed mixture, at a temperature below about thirty degrees centigrade with acetic acid; and third, separating the thus-produced hydrocortisone from the resulting mixture.

3. A process for the production of substantially pure Δ¹-hydrocortisone which comprises the steps of first, hydrolyzing Δ¹-hydrocortisone acetate by mixing a substantially oxygen-free solution of 11β,17α-dihydroxy-21-acetoxy-1,4-pregnadiene-3,20-dione in methanol with an aqueous, substantially oxygen-free solution of potassium bicarbonate in excess of a molar equivalent, calculated on the $\Delta^1$-hydrocortisone acetate, at a temperature between about ten and about thirty degrees centigrade, and continuing the reaction in a substantially oxygen-free, nitrogen atmosphere, at a temperature between about ten and about thirty degrees centigrade; second, neutralizing the hydrolyzed mixture at a temperature below about thirty degrees centigrade with acetic acid; and third, separating the thus-produced $\Delta^1$-hydrocortisone from the resulting mixture.

References Cited in the file of this patent

UNITED STATES PATENTS

| | | |
|---|---|---|
| 2,401,775 | Reichstein | June 11, 1946 |
| 2,634,277 | Minlon | Apr. 7, 1953 |